United States Patent
Ramesh et al.

(10) Patent No.: US 6,916,877 B2
(45) Date of Patent: *Jul. 12, 2005

(54) COATING COMPOSITION INCLUDING A WATER-BASED COPOLYMER CROSS-LINKING WITH A WATER-DISPERSIBLE CROSS-LINKING AGENT, METHOD OF PREPARING THE SAME, AND A CURED FILM THEREOF

(75) Inventors: Swaminathan Ramesh, Canton, MI (US); Paul J. Lessek, Elk Point, SD (US); Wolfgang Bremser, Munster (DE); Paul J. Harris, West Bloomfield, MI (US)

(73) Assignee: BASF Corporation, Southfield, MI (US)

(*) Notice: Subject to any disclaimer, the term of this patent is extended or adjusted under 35 U.S.C. 154(b) by 491 days.

This patent is subject to a terminal disclaimer.

(21) Appl. No.: 09/930,615

(22) Filed: Aug. 14, 2001

(65) Prior Publication Data

US 2002/0132921 A1 Sep. 19, 2002

Related U.S. Application Data

(63) Continuation-in-part of application No. 09/747,473, filed on Dec. 22, 2000, now Pat. No. 6,699,943, and a continuation-in-part of application No. 09/747,475, filed on Dec. 22, 2000, now Pat. No. 6,403,709.

(30) Foreign Application Priority Data

Jun. 16, 2000 (DE) .......................................... 100 29 803

(51) Int. Cl.$^7$ .............................................. C08L 77/00
(52) U.S. Cl. ................. 524/599; 427/372.2; 427/385.5; 524/606; 524/608; 525/88; 525/93; 525/94; 525/329.9; 525/330.5; 526/301
(58) Field of Search .............................. 525/88, 93, 94, 525/329.9, 330.5; 526/301; 427/372.2, 385.5; 524/599, 606, 608

(56) References Cited

U.S. PATENT DOCUMENTS

| | | | |
|---|---|---|---|
| 5,356,669 A | 10/1994 | Rehfuss et al. | 427/407.1 |
| 5,552,497 A | 9/1996 | Taylor et al. | 525/456 |
| 5,567,527 A | 10/1996 | Webster et al. | 428/412 |
| 5,684,078 A | 11/1997 | Pfaffenschlager et al. | 524/457 |
| 5,756,213 A | 5/1998 | Ohrbom et al. | 428/412 |
| 5,786,420 A | 7/1998 | Grandhee | 525/7 |
| 5,827,931 A | 10/1998 | Menovcik et al. | 525/453 |
| 5,854,385 A | 12/1998 | McGee et al. | 528/369 |
| 5,856,382 A | 1/1999 | Ohrbom et al. | 523/414 |
| 5,989,642 A | 11/1999 | Singer et al. | 427/407.1 |
| 6,040,062 A | 3/2000 | McGee et al. | 428/500 |
| 6,045,872 A | 4/2000 | Harmon et al. | 427/407.1 |
| 6,060,556 A | 5/2000 | Collins et al. | 524/533 |
| 6,150,465 A | 11/2000 | Harris et al. | 525/163 |
| 6,346,591 B1 | 2/2002 | Ohrbom et al. | 526/312 |
| 6,699,943 B2 * | 3/2004 | Ramesh et al. | 525/329.9 |
| 2002/0035289 A1 | 3/2002 | Ohrbom et al. | 560/157 |
| 2002/0086966 A1 | 7/2002 | Weise et al. | 526/312 |
| 2002/0103319 A1 | 8/2002 | Ohrbom et al. | 526/312 |

FOREIGN PATENT DOCUMENTS

| | | | |
|---|---|---|---|
| EP | 755 946 | 7/1996 | C08F/2/22 |
| EP | 761 695 | 8/1996 | C08F/8/00 |
| EP | 0 899 103 | 8/1998 | B41J/2/045 |
| WO | WO 99/62978 | 12/1999 | C08F/293/00 |

OTHER PUBLICATIONS

BASF Corporation, et al. International Search Report PCT/US 02/14984, May 13, 2002.
BASF Corp., Ramesh, entitled "Water–based coating composition having carbamate–melamine cross–linking method of preparing the same, and a cured film thereof", U.S. Appl. No. 09/747,473, filed Dec. 22, 2000, pp. 1–43, and Abstract.
BASF Corp., Ramesh, entitled "Water–based coating composition having carbonate–amine cross–linking method of preparing the same, and a cured film thereof", U.S. Appl. No. 09/747,475, filed Dec. 22, 2000, pp. 1–38, and Abstract.

* cited by examiner

Primary Examiner—Edward J. Cain

(57) ABSTRACT

The present invention is directed to a curable, water-based coating composition utilized in waterborne coating systems such as a waterborne primer system. The coating composition is the reaction product of a water-dispersible cross-linking agent and a water-based copolymer prepared by free-radical polymerization. The copolymer is the reaction product of a first block and a second block. The first block is the reaction product of a plurality of ethylenically unsaturated monomers. One of the ethylenically unsaturated monomers includes a functional group suitable for reaction with the cross-linking agent. The functional group in the first block is preferably a carbonate, carbamate, or hydroxyl functional group. Other monomers in the plurality include acrylic acid and methyl methacrylate. The first block is also the reaction product of a vinylaromatic hydrocarbon monomer such as diphenylethylene. The second block is the reaction product of a non-functional, ethylenically unsaturated monomer. Methods for preparing the coating composition and a cured film are also disclosed.

95 Claims, No Drawings

US 6,916,877 B2

COATING COMPOSITION INCLUDING A WATER-BASED COPOLYMER CROSS-LINKING WITH A WATER-DISPERSIBLE CROSS-LINKING AGENT, METHOD OF PREPARING THE SAME, AND A CURED FILM THEREOF

RELATED APPLICATIONS

The present patent application is a Continuation-In-Part of U.S. patent application Ser. No. 09/747,473 U.S. Pat. No. 6,699,943 and Ser. No. 09/747,475, U.S. Pat. No. 6,403,709 which were both filed on Dec. 22, 2000 and which both, in turn, claim priority to and all advantages of German Application No. 10029803.6, entitled "Clearcoat Material And Its Use To Produce Clearcoats And Multicoat Color And/Or Effect Coating Systems," which was filed on Jun. 16, 2000.

FIELD OF THE INVENTION

The subject invention generally relates to a curable, water-based coating composition utilized primarily in waterborne coating systems, such as waterborne basecoat (WBBC) systems, waterborne clearcoat (WBCC) systems, and waterborne primer systems. More specifically, the coating composition includes a water-dispersible cross-linking agent and a water-based copolymer having a particular functional group that is reactive with the cross-linking agent. The subject invention also relates to a method of preparing the coating composition as well as a method of preparing a cured film of the coating composition.

BACKGROUND OF THE INVENTION

Water-based coating compositions include water-based copolymers and cross-linking agents as components. The water-based copolymers are desirable for use in coating systems in the automotive and industrial coatings industries because these copolymers enable formulation of waterborne coating systems, such as WBBC, WBCC, and waterborne primer systems. It is known in the art that waterborne coating systems are ideal as compared to solventborne coating systems because waterborne coating systems have lower content of volatile organic compounds (VOCs).

The water-based copolymers of the prior art have proven to be inadequate for use as a component in water-based coating compositions. The water-based copolymers of the prior art are ineffective because these copolymers are highly viscous, as secondary dispersions, and generally have poorly defined film forming characteristics, as primary dispersions. Furthermore, the cross-linking between the copolymers of the prior art and conventional cross-linking agents, such as aminoplasts, are often particularly susceptible to poor chip performance and environmental acid etch.

The water-based copolymers of the prior art are also deficient because these copolymers often incorporate additional components such as co-solvents and surfactants which are both undesirable components in waterborne coating systems. For instance, conventional water-based copolymers typically incorporate a co-solvent to promote dispersibility of the copolymer in water, and these co-solvents contribute to increased VOCs. Conventional water-based copolymers also typically incorporate surfactants into the copolymer to promote and maintain miscibility and incorporation of the copolymer in water, and as understood by those skilled in the art, the incorporation of surfactants into coating compositions frequently contributes to water sensitivity, humidity, and 'cratering' as well as other coating defects detrimental to the appearance of the waterborne coating system.

The free-radical polymerization methods of preparing the water-based copolymers of the prior art are also deficient. These conventional methods are typically highly exothermic and are therefore difficult to predict and control. The unpredictability of these methods leads to uncontrollable and inconsistent physical properties of the water-based copolymer and ultimately of the water-based coating composition which includes the copolymer as a component. More specifically, the unpredictability of these methods frequently leads to inconsistent molecular weight distribution of the copolymer, and to incomplete conversion of monomer components into the copolymer. Furthermore, in the preparation of conventional water-based copolymers, distribution of the monomer components is random and does not produce a 'tailored' polymeric architecture that is able to meet particular needs depending on whether the copolymer is utilized in a WBBC, WBCC, or waterborne primer system. It is understood in the art that inconsistent molecular weights, incomplete conversion of monomer components, and even random distribution of the monomer components affects, among other things, the stability of the viscosity of the copolymer and can even result in 'gelling' of the copolymer and of the water-based coating composition. Additionally, poor appearance characteristics of the WBBC, WBCC, or waterborne primer system, such as gloss and distinctness of image (DOI), can result from poor rheology, i.e., flow, of the coating composition upon application that is due to the inconsistencies in the water-based copolymer.

In sum, the prior art water-based copolymers which are components of the water-based coating composition, as detailed above, are characterized by one or more inadequacies. Due to the inadequacies identified in the prior art, it is desirable to provide a novel water-based copolymer and coating composition to be utilized in WBBC, WBCC, and waterborne primer systems as well as a novel method of preparing the coating composition and a cured film.

SUMMARY OF THE INVENTION

A curable, water-based coating composition is disclosed. The water-based coating composition of the subject invention is the reaction product of a water-dispersible cross-linking agent and a water-based copolymer. The water-based copolymer is prepared by free-radical polymerization and includes a first block polymer, or first block, and a second block. The first block is preferably a hydrophilic block, and the second block is preferably a hydrophobic block. More specifically, the first block of the copolymer is the reaction product of a plurality of ethylenically unsaturated monomers and a vinylaromatic hydrocarbon monomer. At least one monomer of the plurality includes a functional group suitable for reaction with the cross-linking agent. The second block of the copolymer is the reaction product of a nonfunctional, ethylenically unsaturated monomer.

A method of preparing the water-based coating composition is also disclosed. According to this method, the first block is formed. As discussed above, the first block includes the functional group suitable for reaction with the cross-linking agent. The second block having a non-functional, ethylenically unsaturated monomer is polymerized with the first block to establish the water-based copolymer. The water-dispersible cross-linking agent is provided. The copolymer is then combined with the cross-linking agent thereby preparing the water-based coating composition of the subject invention.

The general object of the subject invention is to develop a water-based coating composition for use in WBBC, WBCC, and waterborne primer systems that utilizes a water-based copolymer including a functional group for cross-linking with a cross-linking agent. It is also a general object to introduce a water-based coating composition that is completely solvent-free, i.e., does not utilize any co-solvents, such that the content of VOCs is zero while maintaining the dispersibility of the copolymer in water without any co-solvents.

It is a further object of the subject invention to develop a water-based coating composition that includes a lower cost cross-linking agent reactive with the functional group of the copolymer such that the WBBC, WBCC, and waterborne primer systems prepared from the water-based coating composition of the subject invention have improved chip resistance and are resistant to environmental acid etch. It is a further object of the subject invention to develop a water-based coating composition that is surfactant-free, yet still fully miscible in water, such that the WBBC, WBBC, and waterborne primer systems prepared from the water-based coating composition of the subject invention are crater resistant and do not suffer from other surfactant-related defects.

Regarding the method of preparing the water-based coating composition, it is an object of the subject invention to introduce a novel method that thoroughly converts monomer components into the copolymer and that is predictable and controllable such that the structure of the copolymer can be 'tailored' and achieved. Therefore, water-based coating compositions prepared according to the method of the subject invention maintain stable viscosities and result in cured films in either a WBBC, a WBCC, or a waterborne primer system having ideal appearance characteristics.

DETAILED DESCRIPTION OF THE INVENTION

The curable, water-based coating composition of the subject invention is utilized in waterborne coating systems. Waterborne coating systems, such as waterborne basecoat (WBBC) systems and waterborne clearcoat (WBCC) systems, are used throughout automotive, industrial, and other coatings industries to coat various substrates for aesthetic and functional purposes, such as color and environmental resistance, respectively. Although the subject invention is directed at WBBC and WBCC systems, it is to be understood that the subject invention may also be utilized in other waterborne coating systems including, but not limited to waterborne primer systems, and in other industries including, but not limited to, the adhesive and sealant industries.

The water-based coating composition of the subject invention includes the reaction product of a water-dispersible cross-linking agent and a water-based copolymer including a functional group suitable for reaction with the cross-linking agent. As will be described further below, the functional group of the copolymer reacts with the cross-linking agent to establish urethane (—NH—CO—O—) cross-linking without use of an isocyanate. The water-based coating composition is prepared by a free-radical polymerization method. In general, the method of preparing the coating composition includes the steps of providing the cross-linking agent, forming a first block including the functional group, polymerizing a second block, including a non-functional, ethylenically unsaturated monomer, with the first block to establish the water-based copolymer, and combining the water-based copolymer with the water-dispersible cross-linking linking agent such that the functional group of the copolymer reacts with the cross-linking agent to prepare the water-based coating composition of the subject invention with urethane cross-linking. These method steps will be discussed in greater detail below.

The water-based copolymer is the reaction product of the first block and the second block. In the most preferred embodiment, the first block is a hydrophilic block, and the second block is a hydrophobic block, and the subject invention will be described with this in mind. However, it is to be understood that the number of blocks is not intended to be limiting. For instance, the water-based copolymer could also be the reaction product of three blocks, a first block, a second block, and a third block. As a non-limiting example, the first block could be a hydrophilic block, the second block a hydrophobic block, and the third block a hydrophilic block. The subject invention may also be understood in terms of functional and non-functional blocks. As such, the first block could be a functional block, the second block a non-functional block, and the third block a functional block. In the most preferred embodiment, the first block which is hydrophilic is also functional, and the second block which is hydrophobic is non-functional. Furthermore, it is conjectured that the functional block, which, as indicated above, participates in the cross-linking reaction with the cross-linking agent, is the component of the water-based composition that actually binds to the substrate or to a coating already on the substrate. It is also conjectured that the non-functional block separates from the functional block, i.e., extends outwardly from the functional block away from the substrate, to establish a cushion-like effect. This effect is established because, as will be described below, the non-functional block has a high weight-average molecular weight relative to the functional block, and it is therefore more able to resist chip and adhesion defects.

The first block is present in an amount from 5 to 15, preferably from 7 to 10, parts by weight based on 100 parts by weight of the coating composition. The first block is the reaction product of a plurality of ethylenically unsaturated monomers and a vinylaromatic hydrocarbon monomer. At least one monomer of the plurality of monomers in the first block includes the functional group that is suitable for reaction with the cross-linking agent. To form the first block, the plurality of ethylenically unsaturated monomers and the vinylaromatic hydrocarbon monomer are polymerized. This polymerization step is conducted over time from 1 to 8, preferably from 2 to 7, and most preferably from 4 to 6, hours, and at a temperature between 50° C. and 100° C. It is to be understood that the time required to conduct this 'polymerization step' includes the time needed for the addition of monomer components as well as any holding or cooling time, where the addition of monomers may not be occurring. It is also to be understood that certain ethylenically unsaturated monomers and certain vinylaromatic hydrocarbon monomers require that the polymerization step be conducted under pressure. If required, such pressure is preferably from 1.5 to 3000 bar, and more preferably from 10 to 1000 bar.

The plurality of ethylenically unsaturated monomers in the first block are selected primarily to ensure the solubility of the copolymer in water and to introduce the function group that is suitable for reaction with the cross-linking agent. To ensure the solubility of the copolymer in water, at least one monomer of the plurality of ethylenically unsaturated monomers is selected to form a salt when reacted with a neutralizing agent. The neutralizing agent will be discussed further below. In addition to the primary purposes of ensuring the solubility of the copolymer in water, and of introducing the functional group, the plurality of ethylenically unsaturated monomers may also be selected to achieve an ideal minimum film forming temperature, MFFT, for the water-based copolymer, and ultimately for a cured film of the water-based coating composition utilized in either the WBBC, WBCC, or waterborne primer system, such that the cured film is resistant to excessive cracking, chipping, and the like. The plurality of ethylenically unsaturated monomers may also be selected to minimize the photo-sensitivity of the coating composition and of the cured film formed of the coating composition.

In the preferred embodiment of the subject invention, the plurality of ethylenically unsaturated monomers includes a first, second, and third ethylenically unsaturated monomer. However, it is to be understood that the plurality of ethylenically unsaturated monomers may include more than three monomers without varying the scope of the subject invention. The first, second, and third ethylenically unsaturated monomers are selected in order to balance the desired physical characteristics as discussed above. That is, the first, second, and third ethylenically unsaturated monomers are selected to balance the solubility of the copolymer in water as well as the MFFT and the photosensitivity of the coating composition and of the cured film. Additionally, the second ethylenically unsaturated monomer introduces the functional group that is suitable for reaction with said cross-linking agent. In terms of the total monomer composition in the first block of the copolymer, the first, second, and third ethylenically unsaturated monomers form from 70 to 99, preferably from 92 to 98, parts by weight based on 100 parts by weight of total monomer composition in the first block. It is to be understood that, in addition to the content of the first, second, and third ethylenically unsaturated monomers, the total monomer composition in the first block also includes the content of the vinylaromatic hydrocarbon monomer. As will be discussed in greater detail below, in certain embodiments, the vinylaromatic hydrocarbon monomer is alternatively defined as at least one ethylenically unsaturated monomer that is different than the plurality, i.e., that is different than the ethylenically unsaturated monomers included in the plurality, and of the general formula $R_1R_2C=CR_3R_4$. In such embodiments, the total monomer composition in the first block is defined to include the content of the at least one ethylenically unsaturated monomer of the general formula $R_1R_2C=CR_3R_4$. In the preferred embodiment, the weight ratio of the first ethylenically unsaturated monomer to the second ethylenically unsaturated monomer in the first block is from 1:0.5 to 1:5, and the weight ratio of the first ethylenically unsaturated monomer to the third ethylenically unsaturated monomer in the first block is from 1:0.5 to 1:5.

The first ethylenically unsaturated monomer of the plurality is selected from the group of compounds consisting of alkyl acrylic acids. It is to be understood that the alkyl acrylic acids each include an alkyl radical, and in the preferred embodiment of the subject invention, the alkyl radical includes up to 20 carbon atoms. More specifically, the alkyl acrylic acids that may be selected as the first ethylenically unsaturated monomer are selected from the group consisting of acrylic acid, methacrylic acid, ethacrylic acid, maleic acid, fumaric acid, itaconic acid, crotonic acid, and mixtures thereof. In all embodiments, the most preferred first ethylenically unsaturated monomer is acrylic acid.

The second ethylenically unsaturated monomer of the plurality varies depending on the embodiment. More specifically, the functional group introduced in the plurality by the second ethylenically unsaturated monomer can vary. The monomer or monomers that are selected for the second ethylenically unsaturated monomer depend on the functional group that is suitable for reaction with the cross-linking agent. Preferred embodiments of the subject invention include carbonate functional groups, hydroxyl functional groups, and mixtures thereof, and in a further preferred embodiment of the subject invention, the second ethylenically unsaturated monomer can include a carbamate functional group modified from an original carbonate functional group.

If the functional group of the second ethylenically unsaturated monomer is a carbonate functional group, then the second ethylenically unsaturated monomer is selected from the group consisting of cycloaliphatic acrylates, cycloaliphatic methacrylates, and mixtures thereof. In the context of the subject invention, cycloaliphatic compounds, such as the cycloaliphatic acrylates and cycloaliphatic methacrylates, are intended to include alicyclic compounds. It is to be understood that each of the cycloaliphatic acrylate and methacrylate compounds include an alkyl radical, and in the preferred embodiment of the subject invention, each of these compounds include up to 20 carbon atoms in the alkyl radical. In this embodiment, the second ethylenically unsaturated monomer is more preferably selected from the group consisting of carbonate-modified glycidyl acrylate, carbonate-modified glycidyl methacrylate, and mixtures thereof. As understood by those skilled in the art, carbonate-modified glycidyl acrylate is a cycloaliphatic acrylate, and carbonate-modified glycidyl methacrylate is a cycloaliphatic methacrylate. As also understood by those skilled in the art, the carbonate-modified glycidyl acrylate is formed by the reaction of glycidyl acrylate, having the chemical formula of $CH_2{:}CHCOOCH_2\underline{CHCH_2O}$, with $CO_2$, under excessive pressure and temperature conditions. Similarly, the carbonate-modified glycidyl methacrylate is formed by the reaction of glycidyl methacrylate, having the chemical formula of $CH_2{:}C(CH_3)COOCH_2\underline{CHCH_2O}$, with $CO_2$, under excessive pressure and temperature conditions. In the most preferred embodiment where the functional group of the second ethylenically unsaturated monomer is the carbonate functional group, the second ethylenically unsaturated monomer is carbonate-modified glycidyl methacrylate. For descriptive purposes, the accepted chemical abstract chemical name for carbonate-modified glycidyl methacrylate is 2-propenoic acid, 2-methyl-, (2-oxo-1,3-dioxalan-4-yl) methyl ester.

It is to be understood that the second ethylenically unsaturated monomer of the first block may introduce more than one carbonate functional group. It is also to be understood that alternative carbonate-modified compounds can be introduced by other chemical compounds such as epoxy group containing compounds reacted with $CO_2$, and even by chemical compounds having unsaturated bonds that are first converted to an epoxy group by known reactions with peroxides.

In a further embodiment of the subject invention, the functional group of the second ethylenically unsaturated monomer may be a carbamate functional group. As described above, the carbonate functional group is modified into the carbonate functional group. Any carbonate group is modifiable into the a carbamate functional group. More specifically, the water-based coating composition according to the subject invention further includes the reaction product of an ammonia-containing compound. The ammonia-containing compound is reactive with the monomer of the plurality in order to modify the carbonate functional group into the carbonate functional group. The ammonia-containing compound is selected from the group consisting of ammonia, ammonium hydroxide, and mixtures thereof. Because the functional group is originally a carbonate functional group, the second ethylenically unsaturated monomer is selected from the same group as above. That is, the second ethylenically unsaturated monomer is selected from the group consisting of cycloaliphatic acrylates, cycloaliphatic methacrylates, and mixtures thereof. It is to be understood that each of the cycloaliphatic acrylate and methacrylate compounds include an alkyl radical, and in the preferred embodiment of the subject invention, each of these compounds include up to 20 carbon atoms in the alkyl radical. In this embodiment, the second ethylenically unsaturated monomer is more preferably selected from the group consisting of carbonate-modified glycidyl acrylate, carbonate-modified glycidyl methacrylate, and mixtures thereof. In the most preferred embodiment where the functional group of the second ethylenically unsaturated monomer is the carbamate functional group, the second ethylenically unsaturated monomer is carbonate-modified glycidyl methacrylate.

exhibit 'sluggish' reactions with the preferred cross-linking agent which will be discussed below. Although in the preferred embodiment the carbonate functional group is converted into the carbamate functional group after the second block is polymerized with the first block, it is to be understood that, alternatively, the carbonate functional group can be converted into the carbamate functional group prior to polymerization of the second block with the first block.

As described above, in the preferred embodiment, ammonium hydroxide is utilized to convert the carbonate functional group into the carbonate functional group. The ammonia, $NH_3$, group of the ammonium hydroxide can form a primary carbamate functional group having a primary hydroxyl (—OH) group which is shown schematically below.

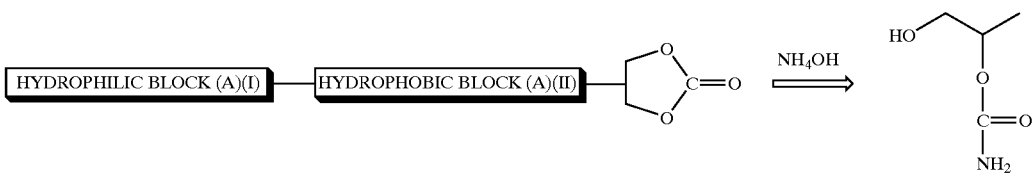

Alternatively, the ammonia, $NH_3$, group of the ammonium hydroxide can form a primary functional group having a secondary hydroxyl (—OH) group which is shown schematically below.

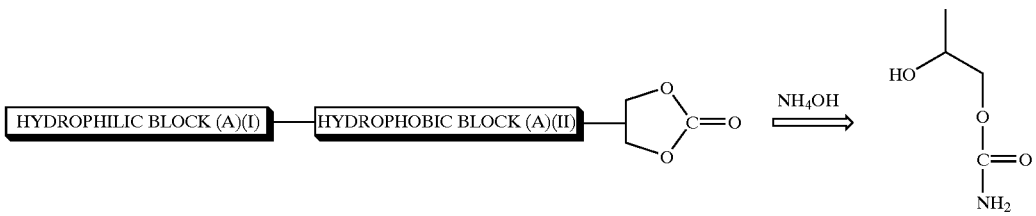

The carbonate functional group in the first block is preferably modified, i.e., converted, into the carbamate functional group after the second block is polymerized with the first block. More specifically, at a temperature between 50° C. and 100° C., more preferably between 50° C. and 70° C., the ammonia-containing, $NH_3$, compound is reacted with the carbonate functional group to convert the carbonate functional group into the carbamate functional group. This reaction step, between the ammonia-containing compound and the carbonate functional group, is conducted over time from 1 to 4 hours.

As described above, the ammonia-containing compound is selected from the group consisting of ammonia, ammonium hydroxide, and mixtures thereof. As understood by those skilled in the art, use of either ammonia or ammonium hydroxide to convert the carbonate functional group results in a primary carbamate functional of the general formula $NH_2COO$—. Additionally, a primary amine can be used to convert the carbonate functional group. Use of the primary amine results in a secondary carbamate functional group of the general formula $NHRCOO$—, where R is an alkyl radical. However, in terms of the preferred embodiment of the subject invention, reaction with the primary amine is not preferred because secondary carbamate functional groups If the functional group of the second ethylenically unsaturated monomer is a hydroxyl functional group, then the second ethylenically unsaturated monomer is selected from the group consisting of aliphatic acrylates, aliphatic methacrylates, and mixtures thereof. It is to be understood that each of the aliphatic acrylate and methacrylate compounds include an alkyl radical, and in the preferred embodiment of the subject invention, each of these compounds include up to 20 carbon atoms in the alkyl radical. In this embodiment, the second ethylenically unsaturated monomer is more preferably selected from the group consisting of hydroxymethyl acrylate, hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, and mixtures thereof. In the most preferred embodiment where the functional group of the second ethylenically unsaturated monomer is the hydroxyl functional group, the second ethylenically unsaturated monomer is hydroxyethyl methacrylate.

If present in the plurality, the third ethylenically unsaturated monomer is preferably methyl methacrylate to optimize the physical properties described herein. Of course, depending on the physical properties desired, the third ethylenically unsaturated monomer could be another monomer including, but not limited to, an aliphatic acrylate, an aliphatic methacrylate, a cycloaliphatic acrylate, or a cycloaliphatic methacrylate.

The vinylaromatic hydrocarbon monomer of the first block is selected from the group consisting of α-methylstyrene, diphenylethylene, dinapthaleneethylene, and mixtures thereof. Further, it is to be understood that other α-alkylstyrenes may be selected as the vinylaromatic hydrocarbon monomer as well as other equivalent compounds including, but not limited to, cis- or trans-stilbene, vinylidenebis (4-N,N-dimethylaminobenzene), vinylidenebis (4-aminobenzene), or vinylidenebis (4-nitrobenzene). Although more than one vinylaromatic hydrocarbon monomer may be included in the first block, the preferred embodiment of the subject invention includes only one vinylaromatic hydrocarbon monomer, most preferably diphenylethylene. In terms of the total monomer composition in the first block of the copolymer, the vinylaromatic hydrocarbon monomer forms from 1 to 20, preferably from 3 to 7, parts by weight based on 100 parts by weight of total monomer composition in the first block.

In certain embodiments, the vinylaromatic hydrocarbon monomer of the first block may alternatively be defined as the at least one ethylenically unsaturated monomer that is different than the other ethylenically unsaturated monomers included in the plurality and that is of the general formula.

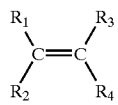

In these embodiments, the radicals $R_1$, $R_2$, $R_3$, and $R_4$, each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R_1$, $R_2$, $R_3$, and $R_4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl, or 2-ethylhexyl.

Examples of suitable cycloalkyl radicals are cyclobutyl, cyclopentyl, or cyclohexyl.

Examples of suitable alkylcycloalkyl radicals are methylenecyclohexane, ethylenecyclohexane, or propane 1,3-diylcyclohexane.

Examples of suitable cycloalkylalkyl radicals are 2-, 3-, or 4-methyl-, -ethyl-, -propyl-, or -butylcyclohex-1-yl.

Examples of suitable aryl radicals are phenyl, naphthyl or biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3-, or 4-phenylcyclohex-1-yl.

Examples of suitable arylalkyl radicals are 2-, 3-, or 4-methyl-, -ethyl-, -propyl-, or -butylphen-1-yl.

Examples of suitable arylcycloalkyl radicals are 2-, 3-, or 4-cyclohexylphen-1-yl.

The above-described radicals $R_1$, $R_2$, $R_3$, and $R_4$ may be substituted. The substituents used may comprise electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclo-hexyl-N-methylamino and N-ethyl-N-methylamino.

Examples of ethylenically unsaturated monomers whose use is particularly preferred in these embodiments are diphenylethylene, dinaphthaleneethylene, cis- or trans-stilbene, vinylidenebis (4-N,N-dimethylamino-benzene), vinylidenebis (4-aminobenzene), and vinylidenebis (4-nitrobenzene).

Also, in accordance with these embodiments, the at least one ethylenically unsaturated monomer may be used individually or as a mixture of at least two monomers.

Finally, as with the preferred embodiment which includes the vinylaromatic hydrocarbon monomer, the preferred ethylenically unsaturated monomer, different than the other ethylenically unsaturated monomers included in the plurality, in these alternative embodiments is diphenylethylene.

In addition to the plurality of ethylenically unsaturated monomers and the vinylaromatic hydrocarbon monomer, the first block is also the reaction product of the neutralizing agent. That is, the neutralizing agent is added to the plurality of ethylenically unsaturated monomers and to the vinylaromatic hydrocarbon monomer to form the first block of the water-based copolymer. Specifically, the neutralizing agent is selected from the group consisting of dimethylethanolamine, amino methyl propanol, ammonia, and mixtures thereof. It is to be understood that other base neutralizing agents may be selected including, but not limited to, sodium hydroxide, potassium hydroxide, diethanolamine, triethanolamine, and mono-, di-, or tri-ethylamine. In the preferred embodiment, the neutralizing agent is ammonia, $NH_3$. The ammonia, $NH_3$, interacts with an acid group of the first ethylenically unsaturated monomer. More specifically, in the preferred embodiment, the ammonia, $NH_3$, interacts with the hydrogen atom of the —COOH group of the acrylic acid, to form a salt of the acrylic acid, having a —COO group, i.e., an acid anion group, and $NH_4^+$. The salt of acrylic acid ensures the solubility of the copolymer in water.

Like the neutralizing agent, an initiator, also known a polymerization promoter, is added to the plurality of ethylenically unsaturated monomers and to the vinylaromatic hydrocarbon monomer to form the first block of the water-based copolymer. The initiator initiates the free-radical polymerization process. The initiator is soluble in water and is selected from the group consisting of inorganic persulfates, dialkyl peroxides, hydroperoxides, peresters, and mixtures thereof. In the preferred embodiment of the subject invention, the initiator is an inorganic persulfate selected from the group consisting of ammonium persulfate, $(NH_4)_2S_2O_8$, potassium persulfate, $K_2S_2O_8$, and sodium persulfate, $Na_2S_2O_8$. Most preferably, the initiator in ammonium persulfate. However, in alternative embodiments, the free-radical polymerization initiator may be a dialkyl peroxides such as di-tert-butyl peroxide or dicumyl peroxide, a hydroperoxide such as cumene hydroperoxide or tert-butyl hydroperoxide, or a perester, such as tert-butyl perbenzoate, tert-butyl perpivalate, tert-butyl per-3,4,5,-trimethylhexanoate or tert-butyl per-2-ethylhexanoate.

The weight ratio of the initiator to the vinylaromatic hydrocarbon monomer is preferably from 1:3 to 3:1. It is to be understood that it is preferred to add comparatively large amounts of the initiator. More specifically, it is preferred that the initiator be present in an amount from 0.5 to 50, more preferably from 1.0 to 20, and most preferably from 3 to 10, parts by weight based on 100 parts by weight of total monomer composition in the first block. At the completion of the formation of the first block, the first block has a non-volatile content of from 20 to 40, preferably from, percent non-volatile by weight. Furthermore, the completed first block has a weight average molecular weight, $M_w$, from 1,000 to 20,000, preferably from 2,000 to 8,000.

In terms of the three most preferred functional groups of carbonate, carbonate modified into carbamate and hydroxyl functional groups, the plurality of ethylenically unsaturated monomers are selected from the group of compounds consisting of aliphatic acrylates, aliphatic methacrylates, cycloaliphatic acrylates, cycloaliphatic methacrylates, alkyl acrylic acids, and mixtures thereof, each of said compounds having up to 20 carbon atoms in the alkyl radical.

More specifically, the aliphatic acrylates are selected from the group consisting of alkyl acrylates, hydroxyalkyl acrylates, and mixtures thereof. The alkyl acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof. The hydroxyalkyl acrylates are of the general formula R—OC(O)C(H):CH$_2$, wherein R is an alkyl radical having from 1 to 6 carbon atoms and at least one hydroxyl group. Preferably, the hydroxyalkyl acrylates are selected from the group consisting of hydroxymethyl acrylate, hydroxyethyl acrylate, hydroxypropyl acrylate, hydroxybutyl acrylate, and mixtures thereof. If a hydroxyalkyl acrylate is selected, the most preferred hydroxyalkyl acrylate is hydroxyethyl acrylate.

The aliphatic methacrylates are selected from the group consisting of alkyl methacrylates, hydroxyalkyl methacrylates, and mixtures thereof. The alkyl methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof. The hydroxyalkyl methacrylates are of the general formula R—OC(O)C(CH$_3$):CH$_2$, wherein R is an alkyl radical having from 1 to 6 carbon atoms and at least one hydroxyl group. Preferably, the hydroxyalkyl methacrylates are selected from the group consisting of hydroxymethyl methacrylate, hydroxyethyl methacrylate, hydroxypropyl methacrylate, hydroxybutyl methacrylate, and mixtures thereof. If a hydroxyalkyl methacrylate is selected, the most preferred hydroxyalkyl methacrylate is hydroxyethyl methacrylate.

The cycloaliphatic acrylates are selected from the group consisting of cyclohexyl acrylate, glycidyl acrylate, carbonate-modified glycidyl acrylate, and mixtures thereof. Similarly, the cycloaliphatic methacrylates are selected from the group consisting of cyclohexyl methacrylate, glycidyl methacrylate, carbonate-modified glycidyl methacrylate, and mixtures thereof. Of course, it is to be understood that, if the functional group of the first block is either the carbonate or the carbamate functional group, then it is necessary that at least the carbonate-modified glycidyl acrylate or carbonate-modified glycidyl methacrylate is selected so as to provide the necessary functional group.

Next, the second block having the non-functional, ethylenically unsaturated monomer, which will be described in detail below, is polymerized with the first block to establish the water-based copolymer. This polymerization step, between the monomer or monomers making up the second block and the first block, is conducted over time from 1 to 8, preferably from 5 to 6, hours, and at a temperature between 50° C. and 100° C., more preferably between 70° C. and 90° C. As with the polymerization step for forming the first block, it is to be understood that the time required to conduct this 'polymerization step' includes the time needed for the addition of monomer components as well as any holding or cooling time, where the addition of monomers may not be occurring. Also, for this polymerization step, preferably no additional free-radical initiator is required. Instead, this polymerization step is preferably initiated by self-formation of radicals. Also, in this polymerization step, the vinylaromatic hydrocarbon monomer of the first block, in the preferred embodiment diphenylethylene, controls the polymerization of the incoming monomer or monomers that make up the second block.

Although the second block of the copolymer is described herein in terms of a single non-functional, ethylenically unsaturated monomer, there is preferably more than one non-functional, ethylenically unsaturated monomer in the preferred embodiment in order to further balance the physical properties described herein. Either individually, or in combination, the non-functional, ethylenically unsaturated monomer is present in an amount from 20 to 50, preferably from 30 to 40, parts by weight based on 100 parts by weight of the coating composition. The non-functional, ethylenically unsaturated monomer is further defined as an alkyl compound having from 2 to 20 carbon atoms in the alkyl radical and having no functional groups suitable for reaction with the cross-linking agent. In the context of the subject invention, the terminology of having no functional groups suitable for reaction with the cross-linking agent is intended to indicate that the monomers selected for the second block of the copolymer do not include a carbonate, carbamate, or hydroxyl functional group, or other equivalent functional groups.

The non-functional, ethylenically unsaturated monomer is selected from the group consisting of styrene, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, glycidyl acrylate, glycidyl methacrylate, and mixtures thereof. More preferably, the non-functional, ethylenically unsaturated monomer is selected from the group consisting of styrene, butyl methacrylate, 2-ethylhexyl methacrylate, and mixtures thereof. In the most preferred embodiment of the subject invention, there are three non-functional, ethylenically unsaturated monomers selected, specifically, styrene, butyl methacrylate, and 2-ethylhexyl methacrylate. It is to be understood that other monomers suitable as the non-functional, ethylenically unsaturated monomer in the second block include, but are not limited to, all monomers described above such as the aliphatic acrylates and methacrylates (e.g. methyl acrylate, etc.) so long as the monomer does not include a functional group suitable for reaction with the cross-linking agent.

Preferably, the non-functional, ethylenically unsaturated monomer or monomers are hydrophobic, i.e., insoluble in water, and in preparing the second block of the copolymer, the non-functional, ethylenically unsaturated monomer or monomers are selected to promote miscibility between the coating composition and other components commonly utilized in WBBC, WBCC, and waterborne primer systems. The non-functional, ethylenically unsaturated monomer or monomers are also selected to contribute to the MFFT for the water-based copolymer, and ultimately for the cured film of the water-based coating composition utilized in either the WBBC, WBCC, or waterborne primer systems. Furthermore, the completed second block has a weight average molecular weight, $M_w$, from 500,000 to 5,000,000, preferably about 1,000,000, and is a true emulsion as understood by those skilled in the art.

As described above, the water-based coating composition is also the reaction product of the water-dispersible cross-linking agent. The water-based copolymer is combined with the water-dispersible cross-linking linking to prepare the water-based coating composition. Generally, the water-dispersible cross-linking agent is selected from the group consisting of water-dispersible aminoplasts, water-dispersible polymers having an acrylamide group, water-dispersible polymers having a methylol or alkoxymethyl group, water-soluble $C_2$ to $C_{20}$ alkyl compounds having an amino functional group, and mixtures thereof. It would be ideal for mixtures of the cross-linking agents listed above to be present if there is more than one particular type of functional group present in the first block. That is, more than one cross-linking agent is also contemplated to be within the scope of the subject invention. The cross-linking agent is present in an amount from 0.1 to 15, preferably from 2 to 6, parts by weight based on 100 parts by weight of the coating composition. However, the particular water-dispersible cross-linking agent selected is preferably determined by the type or types of functional groups present in the first block.

In an embodiment where the functional group in the first block of the copolymer is the carbonate functional group, the water-dispersible cross-linking agent is further defined as a water-soluble $C_2$ to $C_{20}$ alkyl compound having an amino functional group, $NH_2$, reactive with the carbonate functional group. It is to be understood that water-soluble is intended to indicate that approximately 0.25 grams of cross-linking agent or more can dissolve for every 100 ml of water. The water-based copolymer is combined with the cross-linking agent to form the coating composition of the subject invention. When the carbonate functional group is present, the cross-linking agent is preferably a low cost, low molecular weight di-, tri-, or other polyamine. More specifically, the water-soluble $C_2$ to $C_{20}$ alkyl compounds that have at least one amino functional group include, but not limited to, hexamethylenediamine, triaminononane, and mixtures thereof. The most preferred cross-linking agent with the carbonate functional group is triaminononane, having three amino functional groups. For descriptive purposes, triaminononane is the common chemical name, and 4-aminomethyl-1,8-octanediamine is the accepted chemical abstract chemical name.

Upon addition of the cross-linking agent to the copolymer, the amino functional group of the cross-linking agent reacts with the carbonate functional group in the first block of the copolymer. In terms of the preferred embodiment, the first block of the copolymer includes carbonate-modified glycidyl methacrylate as a monomer component as disclosed in the following chemical representation.

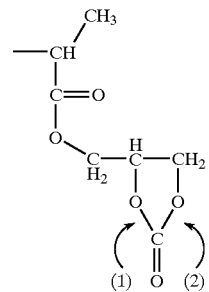

As shown schematically in the above chemical representation of the carbonate-modified glycidyl methacrylate of the preferred embodiment, the amino functional groups, $NH_2$, of the triaminononane react at either (1) or (2) to open the ring and result either in a primary or secondary urethane (—NH—CO—O—) linkage. The resulting primary and secondary urethane linkages established in the coating composition of the subject invention are shown respectively in the following chemical representations.

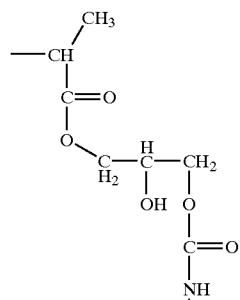

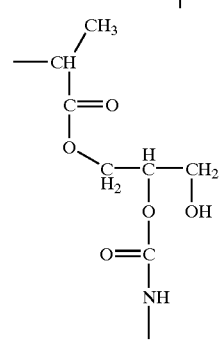

The resulting carbonate—amine cross-linking that establishes either urethane linkages shown above is ideal for resistance to environmental acid etch.

In an embodiment where the functional group in the first block of the copolymer is the carbamate functional group, the water-dispersible cross-linking agent is further defined as a water-dispersible aminoplast that is reactive with the carbamate functional group. The aminoplast is dispersible in water. For all components of the subject invention, it is to be understood that dispersibility in water indicates that the component can be mixed into water to produce a homogenous mixture of the component and the water with no phase separation between the two components. In the context of the cross-linking agent, the cross-linking agent can be mixed into water to produce a homogeneous mixture of the cross-linking agent and the water with no phase separation between the two components. The water-based copolymer is combined with the cross-linking agent to form the coating composition of the subject invention. More specifically, small amounts, from 0.1 to 5 parts by weight based on 100 parts by weight of the total coating composition, of an anionic surfactant are added with the copolymer and the cross-linking agent to guarantee the dispersibility of the cross-linking agent in water. Preferably, a sulfonate-based surfactant is selected as the anionic surfactant.

In this embodiment, where the functional group in the first block of the copolymer is the functional group, the cross-linking agent is selected from the group consisting of water-dispersible aminoplasts, water-dispersible polymers having acrylamide groups, and water-dispersible polymers having methylol or alkoxymethyl groups, and mixtures thereof. It is to be understood that the water-dispersible aminoplasts include urea resins and melamine formaldehyde resins. The melamine formaldehyde resins of the preferred embodiment include either a methylol group, $CH_2OH$, an alkoxymethyl group, or both. The alkoxymethyl group is of the general formula —$CH_2OR_1$, where $R_1$ is an alkyl chain having from 1 to 20 carbon atoms. As understood by those skilled in the art, the methylol groups and the alkoxymethyl groups are reactive with the carbamate functional group.

Possible cross-linking agents include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin.

The preferred embodiment of the subject invention includes hexamethoxymethyl melamine (HMMM). HMMM is commercially available from Monsanto under its Resimene Amino Crosslinker Resins. HMMM is shown in the following chemical representation.

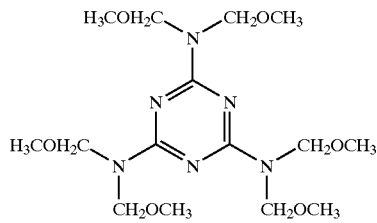

Upon addition of the cross-linking agent to the copolymer, the alkoxymethyl groups of the HMMM, specifically the $CH_2OCH_3$ group, reacts with the carbamate functional group in the first block of the copolymer to establish a urethane (—NH—CO—O—) linkage without use of an isocyanate. The urethane linkage between the copolymer and the cross-linking agent is from the carbamate-melamine reaction and is ideal for resistance to environmental acid etch.

In an embodiment where the functional group in the first block of the copolymer is the hydroxyl functional group, the water-dispersible cross-linking agent is defined as above for the embodiment where the functional group is the carbamate functional group. That is, in this embodiment, the water-dispersible cross-linking agent is further defined as a water-dispersible aminoplast that is reactive with the hydroxyl functional group. The water-based copolymer is combined with the cross-linking agent to form the coating composition of the subject invention. More specifically, small amounts, from 0.1 to 5 parts by weight based on 100 parts by weight of the total coating composition, of an anionic surfactant are added with the copolymer and the cross-linking agent to guarantee the dispersibility of the cross-linking agent in water. Preferably, a sulfonate-based surfactant is selected as the anionic surfactant.

In this embodiment, where the functional group in the first block of the copolymer is the hydroxyl functional group, the cross-linking agent is selected from the group consisting of water-dispersible aminoplasts, water-dispersible polymers having acrylamide groups, and water-dispersible polymers having methylol or alkoxymethyl groups, and mixtures thereof. It is to be understood that the water-dispersible aminoplasts include urea resins and melamine formaldehyde resins. The melamine formaldehyde resins of the preferred embodiment include either a methylol group, $CH_2OH$, an alkoxymethyl group, or both. The alkoxymethyl group is of the general formula —$CH_2OR_1$, where $R_1$ is an alkyl chain having from 1 to 20 carbon atoms. As understood by those skilled in the art, the methylol groups and the alkoxymethyl groups are reactive with the hydroxyl functional group.

Possible cross-linking agents include, but are not limited to, monomeric and polymeric melamine formaldehyde resins, including both partially and fully alkylated melamines such as methylated melamines, butylated melamines, and methylated/butylated melamines. Other cross-linking agents that are urea resins include methylol ureas such as urea formaldehyde resins, and alkoxy ureas such as butylated urea formaldehyde resin. The preferred embodiment of the subject invention includes hexamethoxymethyl melamine (HMMM).

Upon addition of the cross-linking agent to the copolymer, the alkoxymethyl groups of the HMMM, specifically the —$OCH_3$ of the $CH_2OCH_3$ group, reacts with the hydrogen atom of the hydroxyl functional group in the first block of the copolymer thereby forming methanol. A urethane (—NH—CO—O—) linkage, without use of an isocyanate, is established. The urethane linkage between the copolymer and the cross-linking agent is from the hydroxyl—melamine reaction and is ideal for resistance to environmental acid etch.

If the third block is present in the copolymer, then the third block is preferably a functional block. As a functional block, the third block would also include monomers introducing the functional groups, such as 2-hydroxyethyl methacrylate for introducing the hydroxyl functional group. In such an embodiment, the third block of the copolymer would also participate in reacting with the cross-linking agent. Of course, it is to be understood that the third block may also be a non-functional block without limiting the scope of the subject invention.

Overall, the copolymer has a weight-average molecular weight, $M_w$, of from 5,000 to 5,000,000. Additionally, the coating composition of the subject invention has a non-volatile content of from 20 to 60, preferably from 30 to 50, percent non-volatile by weight, and an average volume particle size less than or equal to 200 nm.

As indicated above, the water-based coating composition of the subject invention can be used to form cured films in waterborne basecoat systems, waterborne clearcoat systems, and waterborne primer systems. However, for descriptive purposes only, the subject invention will be described in terms of the cured film in a waterborne primer system. The cured film of the water-based coating composition of the subject invention is prepared by applying the water-based coating composition to the substrate. It is to be understood that the substrate may already have other coatings applied to it, such as an electro-deposited coating. The water-based coating composition can be sprayed onto the substrate by air-atomized or bell-applied spray application, and other equivalent processes. Once applied to the substrate, the coating composition is cured to form the cured film. Although cross-linking may occur prior to the curing step, the functional group of the first block and the cross-linking agent completely react during the curing step to form the cured film of the water-based coating composition including the urethane cross-linking. Preferably, the reaction between the functional group of the first block and the cross-linking agent occurs at a temperature between 100° C. and 175° C., and more preferably at a temperature between 110° C. and 130° C. from 20 to 30 minutes. As described below with respect to the layered-paint system, a colored basecoat composition and a clearcoat composition are preferably applied prior to the curing of the water-based coating composition, functioning as a waterborne primer system, to form the cured film.

The subject invention also includes a layered-paint system utilizing the water-based coating composition. This layered-paint system is applied to the substrate in a wet-on-wet-on-wet process. More specifically, a first layer is applied onto the substrate. The first layer includes the reaction product of the water-dispersible cross-linking agent and the water-based copolymer as described above with respect to the water-based coating composition. In this embodiment of the subject invention, the first layer operates as a waterborne primer system and is preferably applied to the substrate which already has the electro-deposited coating applied to it.

A second layer, including the colored basecoat composition compatible with the first layer, is then applied onto the first layer. Examples of colored basecoat compositions that are compatible with the first layer, i.e., with the water-based coating composition of the subject invention, are codes E55NW038, E172KE170, and E174YE245. E55NW038 is an Autumn Wood Metallic solventborne basecoat. E172KE170 is a Low Gloss Black solventborne basecoat, and E174YE245 is a Cleveland Yellow waterborne basecoat, which are all commercially available from BASF Corporation, Southfield, Mich. The second layer is applied to the first layer as the first layer is wet. That is, the second layer is applied to the first layer without cure of the first layer. However, it is to be understood that a suitable flash period, possibly even including a pre-cure at a slightly elevated temperature, may be incorporated prior to application of the second layer. Colored basecoat compositions compatible with the first layer include, but are not limited to, waterborne basecoat systems and solventborne basecoat systems including polyester, acrylic, epoxy, and polyurethane-based solventborne basecoat systems.

A third layer, including the clearcoat composition compatible with the second layer, is then applied onto the second layer, Examples of clearcoat compositions that are compatible with the second layer, i.e., with the colored basecoat compositions, are codes E126CD020, E04CE002, E176CD051. E126CD020 is Stainguard 6 solventborne clearcoat, E04CE002 is High-Solids solventborne clearcoat, and E176CD051 is Tinted Low Bake solventborne clearcoat, which are all commercially available from BASF Corporation, Southfield, Mich. The third layer is applied to the second layer as the second layer is wet. That is, the third layer is applied to the second layer without cure of the second layer. However, it is to be understood that a suitable flash period, possibly even including a pre-cure at a slightly elevated temperature, may be incorporated prior to application of the third layer. Clearcoat compositions compatible with the second layer include, but are not limited to, waterborne clearcoat systems and solventborne clearcoat systems including polyester, acrylic, epoxy, polyurethane-, and silane-based solventborne clearcoat systems.

It is to be understood that all of the preceding chemical representations are merely two-dimensional chemical representations and that the structure of these chemical representations may be other than as indicated.

The following examples illustrating the preparation of the copolymer, of the complete coating composition, and of the cured film according to the subject invention, as presented herein, are intended to illustrate and not limit the invention.

EXAMPLES

The first block of the copolymer was prepared by adding and reacting the following parts, by weight, unless otherwise indicated.

TABLE 1

| Functional Group<br>First Block<br>Reactant | Hydroxyl<br>Ex. 1<br>Amount<br>(grams) | Carbonate<br>Ex. 2<br>Amount<br>(grams) | Carbamate<br>Ex. 3<br>Amount<br>(grams) |
|---|---|---|---|
| Acrylic acid | 67.9 | 67.9 | 67.9 |
| Hydroxyethl methacrylate | 61.2 | 0 | 0 |
| Carbonate-modified glycidyl methacrylate | 0.0 | 87.6 | 87.6 |
| Methyl methacrylate | 61.2 | 61.2 | 61.2 |
| Diphenylethylene | 10.0 | 10.0 | 10.0 |
| Ammonia | 66.1 | 66.1 | 66.1 + |
| (25% solution of ammonia in water) | | | 32.0 |
| Ammonium persulfate | 15.0 | 15.0 | 15.0 |
| DI water | 400.4 | 400.4 | 400.4 |
| % Non-Volatile | 32.9% | 35.1% | 34.6% |

The addition of the various components to form the first block of the copolymer will only be described in terms of Example 1 having the hydroxyl functional group in the first block. Unless otherwise indicated, a person of ordinary skill in the art is to assume that the various components for forming the first block in Examples 2 and 3 are to be added in the same manner.

Per the above table, Table 1, 350.4 grams of de-ionized (DI) water were added to a reaction flask. The reaction flask, preferably a steel reactor, was equipped with a stirrer and a reflux condenser. The reaction flask, including the DI water, was heated via a conventional heat supply to a temperature of 90° C. Next, two feed streams from two independent feed vessels were fed into the DI water in the reaction flask over approximately 5 to 6 hours to form the first block of the copolymer. More specifically, the first feed stream included 66.1 grams of the neutralizing agent ammonia (in solution with water), 15.0 grams of the initiator ammonium persulfate, and 50.0 grams of additional DI water. The second feed stream included 67.9 grams of acrylic acid, 61.2 grams of hydroxyethyl methacrylate, 61.2 grams of methyl methacrylate, and 10.0 grams of diphenylethylene. During the addition of the two feed streams into the reaction flask containing the DI water, satisfactory reflux was achieved. Further, after the addition of the two feed streams, the temperature of the reaction flask increased from 90° C. to 92° C. thus indicating a slight exotherm. The batch was remained at 92° C. for approximately an additional two hours. After this, the heat supply was removed from the reaction flask and the first block, formed by the polymerization of the acrylic acid, the hydroxyethyl methacrylate, the methyl methacrylate, and the diphenylethylene, as well as by the ammonia and the ammonium persulfate, was allowed to cool. The percent non-volatile of the first block was determined to be 32.9%.

Next, the copolymer of Example 4 was formed by polymerizing a second block with the first block prepared in Example 1, and the copolymer of Example 5 was formed by polymerizing both a second block and a third block with the first block prepared in Example 1. In this example, the third block is functional and preferably incorporates hydroxyethyl methacrylate. However, a further example was prepared incorporating hydroxypropyl methacrylate. The polymerization steps included the following parts, by weight, unless otherwise indicated.

TABLE 2

| Water-Based Copolymer | Detail | Ex. 4 Amount (grams) | Ex. 5 Amount (grams) |
|---|---|---|---|
| First Block | From Example 1 in Table 1 | 91.3 | 91.3 |
| Second Block | Butyl Methacrylate | 138.6 | 140.7 |
|  | Styrene | 78.9 | 52.3 |
|  | Ethylhexyl Methacrylate | 174.0 | 174.2 |
| Third Block | Hydroxyethyl methacrylate | 0.0 | 28.9 |
| Water | — | 516.2 | 516.2 |
| % Non-Volatile | — | 42.3 | 42.6 |

The addition of the various components of the second block with the first block will only be described in terms of Example 4. Both Examples 4 and 5 incorporate the first block of Example 1 having the hydroxyl functional group in the first bock. Unless otherwise indicated, a person of ordinary skill in the art is to assume that the various components for forming the second and third blocks in Example 5 are added in the same manner.

Per the above table, Table 2, 516.2 grams of DI water were added to a reaction flask. The reaction flask, including the DI water, was heated via a conventional heat supply to a temperature of 93° C. for approximately 1 hour. Next, 91.3 grams of the first block was added to the reaction flask including the DI water. Following the complete addition of first block, a feed stream of the second block was added to the reaction flask. More specifically, the feed stream for the second block included 138.6 grams of butyl methacrylate, 78.9 grams of styrene, and 174.0 grams of ethylhexyl methacrylate. This feed stream was added to the reaction flask, including the DI water and the first block, over approximately 5 to 7 hours. The temperature of the reaction flask was 93° C. throughout the addition of the second block feed stream. The polymerization of the second block with the first block completed the formation of the copolymer of the subject invention. The copolymer, including both the first block and the second block, had a percent non-volatile of 42.3%. In Example 5, 28.9 grams of the third, functional block were polymerized with the first and second blocks. Example 5 uses hydroxyethyl methacrylate. It is to be understood that other monomers including, but not limited to, hydroxypropyl methacrylate and carbonate-modified glycidyl methacrylate, may be used in forming the third, functional block. The copolymer of Example 5, including the first, second, and third blocks, had a percent non-volatile of 42.6%.

Next, the completed copolymer and the cross-linking agent were combined to form the coating composition of the subject invention. The coating composition as depicted in this example is merely a preliminary 'scale-up' intended to equal coating compositions utilized in WBBC, WBCC, and waterborne primer systems that may include other components such as pigments, flow additives, catalysts, UV-resistance packages, and the like. The coating composition was prepared according to the following parts, by weight, unless otherwise indicated.

TABLE 3

| Coating Composition | Ex. 6 Amount (grams) Hydroxyl | Ex. 7 Amount (grams) Carbonate | Ex. 8 Amount (grams) Carbamate |
|---|---|---|---|
| Completed Copolymer | 100.0 (from Ex. 5 in Table 2) | 200.0 | 100.0 |
| Cross-Linking Agent Hexamethoxymethyl melamine (HMMM) | 8.6 | 0.0 | 2.7 |
| Cross-Linking Agent Triaminononane | 0.0 | 8.36 | 0.0 |
| Water | 2.0 | 0.0 | 2.4 |
| Anionic Surfactant Solution | 1.4 | 0.0 | 0.9 |
| Total | 112.0 | 208.36 | 106.0 |
| Stability Instant | No viscosity Increase | No viscosity Increase | No viscosity Increase |
| Stability After 24 Hours | No viscosity Increase | No viscosity Increase | No viscosity Increase |
| Sprayability of Coating Composition | -Good | -Very Good | -Good |
| Appearance of Cured Film | -Good -Uniform -Slight Peel | -Acceptable -Tight Film -More than Slight Peel | -Good -Uniform -Slight Peel |
| Initial Physical Property Integrity of Cured Film (after spray applied to substrate, and then a cure at 250° F. (121.1° C.) for 30 minutes) | (1) Cured film dry, hard, glossy, and not gelled (2) Resistance of greater than 150 cycles of MEK 'double rubs' | (1) Cured film dry, hard, glossy, and not gelled (2) Resistance of greater than 150 cycles of MEK 'double rubs' | (1) Cured film dry, hard, glossy, and not gelled (2) Resistance of greater than 150 cycles of MEK 'double rubs' |
| Cold Gravel Test (1 = worst) (10 = best) | 8 | 5 | 5 |

In the above table, Example 6 is a completed copolymer having a hydroxyl functional group in the first block. Furthermore, since the completed copolymer of Example 6 is a derivative of the Example 5 from Table 2, it also includes a functional, third block. Example 7 is a completed copolymer having a carbonate functional group in the first block, and Example 8 is a completed copolymer having a carbamate functional group in the first block.

The completed copolymers of Examples 6 through 8 will be described only in detail with respect to Example 6. Unless otherwise indicated, a person of ordinary skill in the art is to assume that the various components for forming Examples 7 and 8 were added in the same manner.

Per the above table, Table 3, the coating composition of Example 6 was formed by the addition, at room temperature, of 100 grams of the copolymer, 8.6 grams of the cross-linking agent HMMM, 2.0 grams of DI water, and 1.4 grams of the anionic surfactant solution to guarantee the dispersibility of HMMM in water. The anionic surfactant is in solution with water at 30 wt. %. Therefore, 0.42 grams of anionic surfactant were added. The HMMM, DI water, and anionic surfactant were, as preferred, added to the copolymer in a pre-mix of the three components in a total of 12.0 grams. The copolymer was first added into a container, and then the cross-linking agent, in the pre-mix, was added into the container, including the copolymer, under mixing.

After the addition, under mixing, of the cross-linking agent, Example 6 was evaluated for stability. For instant stability, i.e., immediately after the addition of the cross-linking agent, Example 6 did not show any significant increase in viscosity. For stability after a 24 hour time period, the result was the same, no significant viscosity increase.

Furthermore, Example 6 was spray applied to a substrate, specifically ACT e-coated panels. More specifically, Example 6, operating as a waterborne primer system, was spray applied to the ACT e-coated panels. Then a black waterborne basecoat was spray applied to the wet waterborne primer system, and then a solventborne clearcoat was spray applied to the wet black waterborne basecoat. The 'sprayability' of Example 6 was evaluated as good primarily because the example had a workable spray viscosity. As for the curing step, Example 6 was cured in a conventional oven at 250° F. for 30 minutes, and then the cured film of coating composition was evaluated for appearance and initial physical property integrity.

The general appearance of the cured film was uniform and good. Example 6 had a slight 'peel.' Finally, the initial physical property integrity of the cured film of Example 6 was evaluated after the cure of 250° F. for 30 minutes. The results of the initial physical property integrity of the cured film of Example 6 were acceptable and are included above in Table 3. More specifically, the cured film was hard and glossy, and had a satisfactory resistance to MEK 'double rubs.' MEK double rubs verify the resistance of the cured film to a strong solvent, specifically MEK. As understood by those skilled in the art, the MEK double rub method is an acceptable method for preliminary verification of the integrity of an oven-cured film.

Finally, after the cure, the ACT panel having e-coat, the water-based coating composition of the subject invention operating as the waterborne primer system, the black waterborne basecoat, and the solventborne clearcoat, was subjected to a Cold Gravel Test as understood by those skilled in the art. More specifically, according to the Cold Gravel Test, the substrate is cooled to −20° C. for at least one hour prior to the test. The substrate is positioned in a test machine, a gravelometer, in an upright position, 90 degrees from the path of gravel. Three pints of gravel are then blown onto the substrate with an air pressure of 70 PSI. The gravel is preferably water-worn road gravel, not crushed limestone or rock, which will pass through a ⅝" space screen when grated, but will be retained on a ⅜" space screen. The gravelometer is preferably available from Q-Panel Lab Products. Example 6 resulted in a Cold Gravel Test visual evaluation of 8.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A curable, water-based coating composition comprising the reaction product of:

(A) a water-dispersible cross-linking agent; and
(B) a water-based copolymer prepared by free-radical polymerization and comprising the reaction product of;
  (I) a first block comprising the reaction product of;
    (a) a plurality of ethylenically unsaturated monomers wherein at least one monomer of said plurality includes a functional group suitable for reaction with said cross-linking agent (A), and
    (b) a vinylaromatic hydrocarbon monomer; and
  (II) a second block comprising the reaction product of;
    (a) a non-functional, ethylenically unsaturated monomer.

2. A coating composition as set forth in claim 1 wherein said functional group suitable for reaction with said cross-linking agent (A) is selected from the group consisting of carbonate functional groups, hydroxyl functional groups, and mixtures thereof.

3. A coating composition as set forth in claim 1 wherein said functional group suitable for reaction with said cross-linking agent (A) is a carbonate functional group.

4. A coating composition as set forth in claim 3 wherein said plurality of ethylenically unsaturated monomers (B)(I)(a) comprises a first and second ethylenically unsaturated monomer wherein said second ethylenically unsaturated monomer is suitable for reaction with said cross-linking agent (A).

5. A coating composition as set forth in claim 4 wherein said first ethylenically unsaturated monomer is acrylic acid.

6. A coating composition as set forth in claim 4 wherein said second ethylenically unsaturated monomer that is suitable for reaction with said cross-linking agent (A) is selected from the group consisting of carbonate-modified glycidyl acrylate, carbonate-modified glycidyl methacrylate, and mixtures thereof.

7. A coating composition as set forth in claim 4 wherein said second ethylenically unsaturated monomer is carbonate-modified glycidyl methacrylate.

8. A coating composition as set forth in claim 4 wherein said plurality of ethylenically unsaturated monomers (B)(I)(a) further comprises methyl methacrylate as a third ethylenically unsaturated monomer.

9. A coating composition as set forth in claim 4 wherein said first ethylenically unsaturated monomer is selected from the group consisting of alkyl acrylic acids, and said second ethylenically unsaturated monomer is selected from the group consisting of cycloaliphatic acrylates, cycloaliphatic methacrylates, and mixtures thereof, wherein each of said first and second ethylenically unsaturated monomers include up to 20 carbon atoms in the alkyl radical.

10. A coating composition as set forth in claim 9 wherein the weight ratio of said first ethylenically unsaturated monomer to said second ethylenically unsaturated monomer is from 1:0.5 to 1:5.

11. A coating composition as set forth in claim 3 wherein said carbonate functional group suitable for reaction with said cross-linking agent (A) is modified into a carbamate functional group.

12. A coating composition as set forth in claim 11 further comprising the reaction product of an ammonia-containing compound reactive with said monomer of said plurality for modifying said carbamate functional group into said carbonate functional group.

13. A coating composition as set forth in claim 12 wherein said ammonia-containing compound is selected from the group consisting of ammonia, ammonium hydroxide, and mixtures thereof.

14. A coating composition as set forth in claim 11 wherein said plurality of ethylenically unsaturated monomers (B)(I)

(a) comprises a first and second ethylenically unsaturated monomer wherein said second ethylenically unsaturated monomer is suitable for reaction with said cross-linking agent (A).

15. A coating composition as set forth in claim 14 wherein said first ethylenically unsaturated monomer is acrylic acid.

16. A coating composition as set forth in claim 14 wherein said second ethylenically unsaturated monomer that is suitable for reaction with said cross-linking agent (A) is selected from the group consisting of carbonate-modified glycidyl acrylate, carbonate-modified glycidyl methacrylate, and mixtures thereof.

17. A coating composition as set forth in claim 14 wherein said second ethylenically unsaturated monomer is carbonate-modified glycidyl methacrylate.

18. A coating composition as set forth in claim 14 wherein said plurality of ethylenically unsaturated monomers (B)(I)(a) further comprises methyl methacrylate as a third ethylenically unsaturated monomer.

19. A coating composition as set forth in claim 14 wherein said first ethylenically unsaturated monomer is selected from the group consisting of alkyl acrylic acids, and said second ethylenically unsaturated monomer is selected from the group consisting of cycloaliphatic acrylates, cycloaliphatic methacrylates, and mixtures thereof, wherein each of said first and second ethylenically unsaturated monomers include up to 20 carbon atoms in the alkyl radical.

20. A coating composition as set forth in claim 11 wherein the weight ratio of said first ethylenically unsaturated monomer to said second ethylenically unsaturated monomer is from 1:0.5 to 1:5.

21. A coating composition as set forth in claim 1 wherein said functional group suitable for reaction with said cross-linking agent (A) is a hydroxyl functional group.

22. A coating composition as set forth in claim 21 wherein said plurality of ethylenically unsaturated monomers (B)(I)(a) comprises a first and second ethylenically unsaturated monomer wherein said second ethylenically unsaturated monomer is suitable for reaction with said cross-linking agent (A).

23. A coating composition as set forth in claim 22 wherein said first ethylenically unsaturated monomer is acrylic acid.

24. A coating composition as set forth in claim 22 wherein said second ethylenically unsaturated monomer is selected from the group consisting of hydroxymethyl acrylate, hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, and mixtures thereof.

25. A coating composition as set forth in claim 22 wherein said second ethylenically unsaturated monomer is hydroxyethyl methacrylate.

26. A coating composition as set forth in claim 22 wherein said plurality of ethylenically unsaturated monomers (B)(I)(a) further comprises methyl methacrylate as a third ethylenically unsaturated monomer.

27. A coating composition as set forth in claim 22 wherein said first ethylenically unsaturated monomer is selected from the group consisting of alkyl acrylic acids, and said second ethylenically unsaturated monomer is selected from the group consisting of aliphatic acrylates, aliphatic methacrylates, and mixtures thereof, wherein each of said first and second ethylenically unsaturated monomers include up to 20 carbon atoms in the alkyl radical.

28. A coating composition as set forth in claim 27 wherein the weight ratio of said first ethylenically unsaturated monomer to said second ethylenically unsaturated monomer is from 1:0.5 to 1:5.

29. A coating composition as set forth in claim 1 wherein said plurality of ethylenically unsaturated monomers (B)(I)(a) are selected from the group of compounds consisting of aliphatic acrylates, aliphatic methacrylates, cycloaliphatic acrylates, cycloaliphatic methacrylates, alkyl acrylic acids, and mixtures thereof, each of said compounds having up to 20 carbon atoms in the alkyl radical.

30. A coating composition as set forth in claim 29 wherein said aliphatic acrylates are selected from the group consisting of alkyl acrylates, hydroxyalkyl acrylates, and mixtures thereof.

31. A coating composition as set forth in claim 30 wherein said alkyl acrylates are selected from the group consisting of methyl acrylate, ethyl acrylate, propyl acrylate, butyl acrylate, hexyl acrylate, ethylhexyl acrylate, stearyl acrylate, lauryl acrylate, and mixtures thereof.

32. A coating composition as set forth in claim 30 wherein said hydroxyalkyl acrylates are of the general formula R—OC(O)C(H):CH$_2$, wherein R is an alkyl radical having from 1 to 6 carbon atoms and at least one hydroxyl group.

33. A coating composition as set forth in claim 30 wherein said hydroxyalkyl acrylates are selected from the group consisting of hydroxymethyl acrylate, hydroxyethyl acrylate, hydroxypropyl acrylate, hydroxybutyl acrylate, and mixtures thereof.

34. A coating composition as set forth in claim 29 wherein said aliphatic methacrylates are selected from the group consisting of alkyl methacrylates, hydroxyalkyl methacrylates, and mixtures thereof.

35. A coating composition as set forth in claim 34 wherein said alkyl methacrylates are selected from the group consisting of methyl methacrylate, ethyl methacrylate, propyl methacrylate, butyl methacrylate, hexyl methacrylate, ethylhexyl methacrylate, stearyl methacrylate, lauryl methacrylate, and mixtures thereof.

36. A coating composition as set forth in claim 34 wherein said hydroxyalkyl methacrylates are of the general formula R—OC(O)C(CH$_3$):CH$_2$, wherein R is an alkyl radical having from 1 to 6 carbon atoms and at least one hydroxyl group.

37. A coating composition as set forth in claim 34 wherein said hydroxyalkyl methacrylates are selected from the group consisting of hydroxymethyl methacrylate, hydroxyethyl methacrylate, hydroxypropyl methacrylate, hydroxybutyl methacrylate, and mixtures thereof.

38. A coating composition as set forth in claim 29 wherein said cycloaliphatic acrylates are selected from the group consisting of cyclohexyl acrylate, glycidyl acrylate, carbonate-modified glycidyl acrylate, and mixtures thereof.

39. A coating composition as set forth in claim 29 wherein said cycloaliphatic methacrylates are selected from the group consisting of cyclohexyl methacrylate, glycidyl methacrylate, carbonate-modified glycidyl methacrylate, and mixtures thereof.

40. A coating composition as set forth in claim 29 wherein said alkyl acrylic acids are selected from the group consisting of acrylic acid, methacrylic acid, ethacrylic acid, maleic acid, fumaric acid, itaconic acid, crotonic acid, and mixtures thereof.

41. A coating composition as set forth in claim 1 wherein said first block (A)(I) is present in an amount from 5 to 15 parts by weight based on 100 parts by weight of said coating composition.

42. A coating composition as set forth in claim 1 wherein said second block (A)(II) is present in an amount from 20 to 50 parts by weight based on 100 parts by weight of said coating composition.

43. A coating composition as set forth in claim 1 wherein said first block (B)(I) further comprises the reaction product of a neutralizing agent.

44. A coating composition as set forth in claim 43 wherein said neutralizing agent is selected from the group consisting of dimethylethanolamine, amino methyl propanol, ammonia, and mixtures thereof.

45. A coating composition as set forth in claim 1 wherein said first block (B)(I) further comprises the reaction product of an initiator.

46. A coating composition as set forth in claim 45 wherein said initiator is selected from the group consisting of inorganic persulfates, dialkyl peroxides, hydroperoxides, peresters, and mixtures thereof.

47. A coating composition as set forth in claim 45 wherein the weight ratio of said initiator to said at least one vinylaromatic hydrocarbon monomer (A)(I)(b) is from 1:3 to 3:1.

48. A coating composition as set forth in claim 1 wherein said at least one vinylaromatic hydrocarbon monomer (B)(I)(b) is selected from the group consisting of α-methylstyrene, diphenylethylene, dinapthaleneethylene, and mixtures thereof.

49. A coating composition as set forth in claim 1 wherein said non-functional, ethylenically unsaturated monomer (B)(II)(a) is further defined as an alkyl compound having from 2 to 20 carbon atoms in the alkyl radical and having no functional groups suitable for reaction with said cross-linking agent (A).

50. A coating composition as set forth in claim 1 wherein said non-functional, ethylenically unsaturated monomer (B)(II)(a) is selected from the group consisting of styrene, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, glycidyl acrylate, glycidyl methacrylate, and mixtures thereof.

51. A coating composition as set forth in claim 1 wherein said non-functional, ethylenically unsaturated monomer (B)(II)(a) is selected from the group consisting of styrene, butyl methacrylate, 2-ethylhexyl methacrylate, and mixtures thereof.

52. A coating composition as set forth in claim 1 further comprising the reaction product of an anionic surfactant.

53. A coating composition as set forth in claim 1 wherein said first block (A)(I) has a molecular weight of from 1,000 to 20,000.

54. A coating composition as set forth in claim 1 having a non-volatile content of from 20 to 60 percent non-volatile by weight.

55. A coating composition as set forth in claim 1 having an average particle size of less than or equal to 200 nm.

56. A coating composition as set forth in claim 1 wherein said copolymer (B) has a molecular weight of from 5,000 to 5,000,000.

57. A coating composition as set forth in claim 1 wherein said water-dispersible cross-linking agent (A) is present in an amount from 0.1 to 15 parts by weight based on 100 parts by weight of said coating composition.

58. A coating composition as set forth in claim 1 wherein said water-dispersible cross-linking agent (A) is selected from the group consisting of water-dispersible aminoplasts, water-dispersible polymers having an acrylamide group, water-dispersible polymers having a methylol or alkoxymethyl group, water-soluble $C_2$ to $C_{20}$ alkyl compounds having an amino functional group, and mixtures thereof.

59. A coating composition as set forth in claim 11 wherein said water-dispersible cross-linking agent (A) comprises a water-dispersible aminoplast reactive with said carbamate functional group.

60. A coating composition as set forth in claim 59 wherein said water-dispersible aminoplast comprises a melamine formaldehyde resin having a methylol group, an alkoxymethyl group, or both, which are reactive with said carbamate functional group.

61. A coating composition as set forth in claim 21 wherein said water-dispersible cross-linking agent (A) comprises a water-dispersible aminoplast reactive with said hydroxyl functional group.

62. A coating composition as set forth in claim 61 wherein said water-dispersible aminoplast comprises a melamine formaldehyde resin having a methylol group, an alkoxymethyl group, or both, which are reactive with said hydroxyl functional group.

63. A coating composition as set forth in claim 3 wherein said water-dispersible cross-linking agent (A) comprises a water-soluble $C_2$ to $C_{20}$ alkyl compound having an amino functional group reactive with said carbonate functional group.

64. A coating composition as set forth in claim 63 wherein said water-soluble $C_2$ to $C_{20}$ alkyl compound having an amino functional group is selected from the group consisting of hexamethylenediamine, triaminononane, and mixtures thereof.

65. A coating composition as set forth in claim 1 wherein said water-dispersible cross-linking agent (A) comprises a melamine formaldehyde resin having a methylol group, an alkoxymethyl group, or both, which are reactive with said functional group.

66. A coating composition as set forth in claim 1 wherein said water-dispersible cross-linking agent (A) comprises a water-soluble $C_2$ to $C_{20}$ alkyl compound having an amino functional group.

67. A coating composition as set forth in claim 1 wherein said water-based copolymer (B) further comprises the reaction product of a third block, said third block comprising said at least one monomer of said plurality including said functional group suitable for reaction with said cross-linking agent (A).

68. A curable, water-based coating composition comprising the reaction product of:
(A) a water-dispersible cross-linking agent; and
(B) a water-based copolymer prepared by free-radical polymerization and comprising the reaction product of;
  (I) a first block comprising the reaction product of;
    (a) an alkyl acrylic acid,
    (b) an ethylenically unsaturated monomer including a functional group suitable for reaction with said cross-linking agent, and
    (c) a vinylaromatic hydrocarbon monomer; and
  (II) a second block comprising the reaction product of;
    (a) a non-functional, ethylenically unsaturated monomer.

69. A coating composition as set forth in claim 68 wherein said functional group suitable for reaction with said cross-linking agent (A) is a carbonate functional group.

70. A coating composition as set forth in claim 69 wherein said carbonate functional group is modified into a carbamate functional group.

71. A coating composition as set forth in claim 70 further comprising the reaction product of an ammonia-containing compound reactive with said ethylenically unsaturated monomer for modifying said carbonate functional group into said carbamate functional group.

72. A coating composition as set forth in claim 68 wherein said functional group suitable for reaction with said cross-linking agent (A) is a hydroxyl functional group.

73. A coating composition as set forth in claim 69 wherein said water-dispersible cross-linking agent (A) is a water-dispersible $C_2$ to $C_{20}$ alkyl compound having an amino functional group reactive with said carbonate functional group.

74. A coating composition as set forth in claim 70 wherein said water-dispersible cross-linking agent (A) is a water-dispersible aminoplast reactive with said carbamate functional group.

75. A coating composition as set forth in claim 72 wherein said water-dispersible cross-linking agent (A) comprises a water-dispersible aminoplast reactive with said hydroxyl functional group.

76. A coating composition as set forth in claim 75 wherein said water-dispersible aminoplast comprises a melamine formaldehyde resin having a methylol group, an alkoxymethyl group, or both, which are reactive with said hydroxyl functional group.

77. A curable, water-based coating composition comprising the reaction product of:
(A) a water-dispersible cross-linking agent; and
(B) a water-based copolymer prepared by free-radical polymerization and comprising the reaction product of;
(I) a first block comprising the reaction product of;
(a) a plurality of ethylenically unsaturated monomers wherein at least one monomer of said plurality includes a functional group suitable for reaction with said cross-linking agent (A), and
(b) at least one ethylenically unsaturated monomer different than said plurality of ethylenically unsaturated monomers (A)(I)(a) and of the general formula

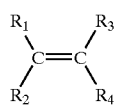

wherein the radicals each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R_1$, $R_2$, $R_3$, and $R_4$ are substituted or unsubstituted aryl, arylalkyl or arylcycloalkyl radicals, especially substituted or unsubstituted aryl radicals; and
(II) a second block comprising the reaction product of;
(a) a non-functional, ethylenically unsaturated monomer.

78. A layered-paint system applied wet-on-wet-on-wet onto a substrate, said layered-paint system comprising:
a first layer applied onto the substrate, said first layer comprising the reaction product of:
(A) a water-dispersible cross-linking agent; and
(B) a water-based copolymer prepared by free-radical polymerization and comprising the reaction product of;
(I) a first block comprising the reaction product of;
(a) a plurality of ethylenically unsaturated monomers wherein at least one monomer of said plurality includes a functional group suitable for reaction with said cross-linking agent (A), and
(b) a vinylaromatic hydrocarbon monomer; and
(II) a second block comprising the reaction product of;
(a) a non-functional, ethylenically unsaturated monomer;

a second layer applied onto said first layer, said second layer comprising a colored basecoat composition compatible with said first layer; and
a third layer applied onto said second layer, said third layer comprising a clearcoat composition compatible with said second layer.

79. A method of preparing a curable, water-based coating composition, said method comprising the steps of:
(A) providing a water-dispersible cross-linking agent;
(B) forming a first block of a water-based copolymer wherein the first block includes a functional group suitable for reaction with the cross-linking agent;
(C) polymerizing a second block, that includes a non-functional, ethylenically unsaturated monomer, with the first block to establish the water-based copolymer; and
(D) combining the water-based copolymer with the water-dispersible cross-linking linking agent that is reactive with the functional group of the copolymer to prepare the water-based coating composition.

80. A method as set forth in claim 79 wherein the steps of (B) and (C) are conducted at a temperature between 50° C. and 100° C.

81. A method as set forth in claim 80 wherein the step of (B) forming the first block is further defined as polymerizing;
(a) a plurality of ethylenically unsaturated monomers wherein at least one monomer of the plurality includes the functional group; and
(b) a vinylaromatic hydrocarbon monomer; to form the first block of the water-based copolymer.

82. A method as set forth in claim 81 wherein the step of polymerizing the plurality of ethylenically unsaturated monomers and the vinylaromatic hydrocarbon monomer is conducted over time from 1 to 8 hours.

83. A method as set forth in claim 81 wherein the plurality of ethylenically unsaturated monomers are selected from the group of compounds consisting of aliphatic acrylates, aliphatic methacrylates, cycloaliphatic acrylates, cycloaliphatic methacrylates, alkyl acrylic acids, and mixtures thereof, each of the compounds having up to 20 carbon atoms in the alkyl radical.

84. A method as set forth in claim 79 wherein the step of (B) forming the first block further comprises the step of adding a neutralizing agent selected from the group consisting of dimethylethanolamine, amino methyl propanol, ammonia, and mixtures thereof, to the plurality of ethylenically unsaturated monomers and the vinylaromatic hydrocarbon monomer to form the first block of the water-based copolymer.

85. A method as set forth in claim 79 wherein the step of (B) forming the first block further comprises the step of adding an initiator selected from the group consisting of inorganic persulfates, dialkyl peroxides, hydroperoxides, peresters, and mixtures thereof, to the plurality of ethylenically unsaturated monomers and the vinylaromatic hydrocarbon monomer to form the first block of the water-based copolymer.

86. A method as set forth in claim 79 wherein the vinylaromatic hydrocarbon monomer is selected from the group consisting of α-methylstyrene, diphenylethylene, dinapthaleneethylene, and mixtures thereof.

87. A method as set forth in claim 79 wherein the step of (C) polymerizing the second block, that includes the non-functional, ethylenically unsaturated monomer, with the first block is further defined as polymerizing a plurality of non-functional, ethylenically unsaturated monomers with the first block to establish the water-based copolymer.

88. A method as set forth in claim 87 wherein the plurality of non-functional, ethylenically unsaturated monomers are selected from the group consisting of styrene, methyl acrylate, methyl methacrylate, butyl acrylate, butyl methacrylate, 2-ethylhexyl acrylate, 2-ethylhexyl methacrylate, cyclohexyl acrylate, cyclohexyl methacrylate, glycidyl acrylate, glycidyl methacrylate, and mixtures thereof.

89. A method as set forth in claim 87 wherein the step of polymerizing the plurality of non-functional, ethylenically unsaturated monomers is conducted over time from 1 to 8 hours.

90. A method of preparing a cured film of a water-based coating composition, said method comprising the steps of:
(A) providing a water-dispersible cross-linking agent;
(B) forming a first block of a water-based copolymer wherein the first block includes a functional group suitable for reaction with the cross-linking agent;
(C) polymerizing a second block, that includes a non-functional, ethylenically unsaturated monomer, with the first block to establish the water-based copolymer;
(D) combining the water-based copolymer with the water-dispersible cross-linking linking agent that is reactive with the functional group of the copolymer to prepare the water-based coating composition;
(E) applying the water-based coating composition to a substrate; and
(F) curing the water-based coating composition to form the cured film.

91. A method as set forth in claim 90 wherein the step of (E) applying the water-based coating composition to the substrate is further defined as spraying the water-based coating composition on to the substrate.

92. A method as set forth in claim 90 wherein the step of (F) curing the water-based coating composition is further defined as reacting the functional group of the first block with the water-dispersible cross-linking agent to prepare the cured film of the water-based coating composition.

93. A method as set forth in claim 92 wherein the step of reacting the functional group of the first block with the water-dispersible cross-linking agent is conducted at a temperature between 100° C. and 175° C.

94. A method as set forth in claim 90 further comprising the step of applying a colored basecoat composition to the applied water-based coating composition prior to the step of (E) curing the water-based coating composition to form the cured film.

95. A method as set forth in claim 94 further comprising the step of applying a clearcoat composition to the applied colored basecoat composition prior to the step of (E) curing the water-based coating composition to form the cured film.

* * * * *